United States Patent [19]

Sinclair

[11] Patent Number: 5,464,919
[45] Date of Patent: Nov. 7, 1995

[54] FLAME RETARDANT POLYESTER-POLYURETHANE HYBRID RESIN COMPOSITIONS

[75] Inventor: David P. Sinclair, Winfield, Ill.

[73] Assignee: Cook Composites and Polymers Co., Port Washington, Wis.

[21] Appl. No.: 241,185

[22] Filed: May 11, 1994

[51] Int. Cl.6 .................................................. C08G 18/10
[52] U.S. Cl. ........................... 528/60; 528/66; 528/75; 528/85; 528/272; 525/28; 525/36; 525/55; 525/440; 525/445; 524/495; 524/496
[58] Field of Search ........................ 528/60, 66, 75, 528/85, 272; 525/28, 36, 55, 440, 445; 524/495, 496

[56] References Cited

U.S. PATENT DOCUMENTS

| | | | |
|---|---|---|---|
| 4,361,623 | 11/1982 | Newkirk et al. | 428/394 |
| 4,994,543 | 2/1991 | Nakamo et al. | 528/83 |
| 5,296,545 | 3/1994 | Heise | 525/28 |

*Primary Examiner*—James Seidleck
*Assistant Examiner*—Dvc Truong
*Attorney, Agent, or Firm*—Whyte Hirschboeck Dudek

[57] ABSTRACT

The invention relates to polyester-polyurethane hybrid resins containing halogenated aromatic polycarboxylate moieties to obtain flame retardance without significantly affect the preparation, processing and physical properties of the hybrid resins.

12 Claims, No Drawings

5,464,919

FLAME RETARDANT POLYESTER-POLYURETHANE HYBRID RESIN COMPOSITIONS

This invention relates to flame retardant polyester-polyurethane hybrid resin compositions. More particularly, the invention relates to polyester-polyurethane hybrid resins containing halogenated aromatic polycarboxylate moieties to obtain flame retardance without significantly affecting the preparation, processing and physical properties of the hybrid resins.

BACKGROUND OF THE INVENTION

Polyester-polyurethane hybrid resins are well-known in the art of thermoset molding compositions. These resins are normally tougher than polyesters and stronger, stiffer and have greater thermal resistance than polyurethanes. Such hybrid resins usually comprise a hydroxy-terminated unsaturated polyester polyol, an ethylenically unsaturated monomer such as styrene, a polyisocyanate, a free radical polymerization initiator and often other additives. They can be easily adapted to many common thermoset molding techniques employed in polyurethane and unsaturated polyester industries. Such hybrid resins are commercially available from Amoco Chemical Company under the trademark Xycon and are supplied as two component liquid systems. One component, the A-side, contains the polyisocyanate and the free radical polymerization initiator, while the other component, the B-side, contains the hydroxy-terminated unsaturated polyester polyol/styrene solution and optionally a polyurethane catalyst and/or filler.

There are many end uses for polyester-polyurethane hybrid resin compositions including the manufacture of parts for and construction of automobiles, trucks, boats, machine housings and household items such as bath fixtures. In many of these applications, it is desirable to provide resins which have flame retardant properties. However, one problem associated with the manufacture of polyester-polyurethane hybrid resins having flame retardancy is the loss of desirable properties such as strength, stiffness and thermal resistance due to the addition of flame retardant compounds. Another problem is the settling out of the flame retardant compound from the hybrid resin composition. Still another problem is the effect which the flame retardant compound may have on moldability of the hybrid resin.

The general object of this invention is to provide polyester-polyurethane hybrid resin compositions having flame retardant properties without having an adverse effect on other physical properties of the hybrid resin compositions. It is another object to provide a simple, inexpensive method for making such flame retardant polyester-polyurethane hybrid resin compositions. It is yet another object to provide molded articles having improved flame retardancy which are made from the hybrid resins. Other objects appear hereinafter.

These and other objects are achieved by polyester-polyurethane hybrid resin compositions which are formed by the reaction of an A-side composition and a B-side composition. The A-side composition comprises a polyfunctional isocyanate compound and a free radical polymerization initiator. The B-side composition comprises a mixture of an ethylenically unsaturated monomer solution which has dissolved therein about 40–90 wt. % of a substantially water-free, hydroxyl-terminated, unsaturated polyester polyol having an acid number less than five, said polyester polyol comprising an oligomer obtained by the condensation reaction of a polycarboxylic acid and an unsaturated polycarboxylic acid or anhydride with a polyhydric alcohol, wherein the polycarboxylic acid moieties of the polyester polyol comprise from about 15 to about 50 mole % of at least one halogenated aromatic polycarboxylic acid. Unexpectedly, it has been found that by using polyols comprising halogenated aromatic polycarboxylic acids, flame retardant properties can be achieved without adversely affecting other properties of the hybrid resins. These halogenated aromatic polycarboxylic acids can be substituted for all or part of conventional polycarboxylic acids such as isophthalic acid in a hybrid resin formulation without significantly affecting the preparation, processing, and basic engineering properties of the hybrid resin. This behavior is in contrast to the incorporation of other halogenated monomers in a hybrid resin formulation such as halogenated phthalic anhydrides or halogenated glycols which prevent the formation of hydroxyl-terminated unsaturated polyesters. The use of halogenated aromatic polycarboxylic acids in a flame retardant hybrid resin is also advantageous over adding conventional flame retardant additives because conventional additives impart flame retardance at the expense of other properties, such as gel time, flexural modulus and impact resistance.

For the purpose of this invention, the term "cure" or "curing" means the transformation of the polyester-polyurethane hybrid resin composition from a liquid or flowable paste to a solid cross-linked material at the time of molding. This curing occurs by cross-linking of the reactive sites in the hybrid resin system, including the reaction of the isocyanate with the reactive end groups of the polyol, and via the vinyl addition reaction between the ethylenically unsaturated monomer and the unsaturated polyester polyol. Depending on the catalyst employed, curing can optimally occur at temperatures of about 30° C. to about 100° C. for a time of between about one minute and about one hour. The term "polyfunctional" and the prefix "poly-" as used herein, are intended to include functionalities of two or greater.

SUMMARY OF THE INVENTION

The polyester-polyurethane hybrid resins of the invention are formed by the reaction of an A-side composition and a B-side composition. The A-side composition comprises a polyfunctional isocyanate compound and a free radical polymerization initiator. The B-side composition comprises a mixture of an ethylenically unsaturated monomer solution which has dissolved therein about 40–90 wt. % of a substantially water-free, unsaturated polyester polyol having an acid number less than five, said polyester polyol comprising an oligomer obtained by the condensation reaction of a polycarboxylic acid and an unsaturated polycarboxylic acid or anhydride with a polyhydric alcohol, wherein the polycarboxylic acid moieties of the polyester polyol comprise from about 15 to about 50 mole % of at least one halogenated aromatic polycarboxylic acid. The invention also comprises a method for making such hybrid resins. In a preferred embodiment of the invention, the hybrid resins comprise about 20–25 wt. % isocyanate, about 50–60 wt. % polyester polyol and about 20–25 wt. % monomer solution of the total resinous components. Further, in another preferred embodiment, the hybrid resins additionally comprise from about 1 wt. % to about 10 wt. % of a flame retardant synergist.

The hybrid resin compositions made according to the invention have many advantages. First, the compositions of the invention provide flame retardant hybrid resins with good physical properties. Second, they enable a formulation which does not require flame retardant additives that can separate or settle. Third, these hybrid resin compositions do not substantially alter the cure behavior of the hybrid resins.

DETAILED DESCRIPTION OF THE INVENTION

The A-side of the hybrid resins comprises an isocyanate and a free radical polymerization initiator. The isocyanate compound, typically referred to as a polyisocyanate, must have at least two functional groups and be capable of reacting with the polyester polyol of the B-side. Examples of suitable isocyanate compounds include 2,4- and 2,6-toluene diisocyanate (TDI), 4,4'-diphenylmethylene diisocyanate (MDI), polymethylene polyphenyl isocyanate (PMPPI), dianisidine diisocyanate, metaphenylene diisocyanate, isophrone diisocyanate, hexamethylene diisocyanate and mixtures thereof. The preferred isocyanates are liquified MDI's or PMPPI'S. A preferred isocyanate is Isonate 143L manufactured by Dow Chemical Company which is a polycarbodiimide-modified diphenylmethane diisocyanate having an isocyanate equivalent weight of about 144.5 g/equivalent of NCO, an NCO content by weight of 29.2%, a viscosity at 25° C. of 33 cps, a density at 25° C. of 1.214 g/ml and an NCO functionality of about 2.1. Another example of a preferred isocyanate is Isonate 240, also manufactured by Dow Chemical. Isonate 240 is a modified 4,4'-diphenylmethylene diisocyanate (MDI) prepolymer produced by reacting high-purity diphenylmethane diisocyanate with a saturated polyester. Isonate 240 is characterized as having an isocyanate equivalent weight of about 226.3 g/equivalent of NCO, an NCO content by weight of 18.7 percent, a viscosity at 25° C. of 1500 cps, a density at 25 C of 1.22 g/ml and an NCO functionality of about 2.05. An optimal hybrid resin according to the invention has an NCO:OH equivalent ratio of about 0.95 to about 1.2.

The free radical polymerization initiators of the A-side useful in producing the hybrid resins of this invention are vinyl polymerization initiators such as peroxides, persulfides, perborates, percarbonates, and azo compounds or any other suitable material capable of initiating the vinyl polymerization of the polyester polyol and/or the ethylenically unsaturated monomer. Illustrative of such initiators are benzoyl peroxide (BPO), tertiarybutyl peroxybenzoate (TBPB), 2,2'-azo-bis-isobutyronitrile, dibenzoyl peroxide, lauryl peroxide, di-t-butyl peroxide, diisopropyl peroxide carbonate and t-butyl peroxy-2-ethylhexanoate. Promoters can also be used in combination with vinyl polymerization peroxide initiators to control the rate of free radical initiation. The preferred free radical polymerization initiator is BPO at a concentration of between about one and two wt. %.

The B-side of the hybrid resin of the invention comprises a mixture of an ethylenically unsaturated monomer solution which has dissolved therein about 40–90 wt. % of a substantially water-free, hydroxyl-terminated, unsaturated polyester polyol having an acid number less than five, said polyester polyol comprising an oligomer obtained by the condensation reaction of a polycarboxylic acid and an unsaturated polycarboxylic acid or anhydride with a polyhydric alcohol, wherein the polycarboxylic acid moieties of the polyester polyol comprise from about 15 to about 50 mole % of at least one halogenated aromatic polycarboxylic acid. The ethylenically unsaturated monomers which are useful in the hybrid resins of the invention can be any ethylenically unsaturated monomer capable of cross-linking the unsaturated polyester polyol via vinyl addition polymerization. Examples of useful ethylenically unsaturated monomers are styrene, o-, m-, p-methyl styrene, mono-, di- or tri-chloro- or bromostyrene, ring-halogenated styrenes, methyl acrylate, methyl methacrylate, t-butylstyrene, divinyl benzene, diallyl phthalate, diallyl isophthalate, triallyl cyanurate and mixtures thereof. The preferred monomer is styrene because it provides an economical monomer solution, is a solvent for the unsaturated resin and enables low viscosity at low monomer levels.

The unsaturated polyester polyol of the B-side is an oligomer obtained by the condensation reaction of a polycarboxylic acid and an unsaturated polycarboxylic acid or anhydride with a glycol or a polyhydric alcohol, wherein the polycarboxylic acid moieties of the polyester polyol comprise from about 15 to about 50 mole % of at least one halogenated aromatic polycarboxylic acid. The polyester polyols used in this invention have an acid number less than five, and preferably less than about two to prevent foaming during the reaction with the isocyanate. Further, the polyols used in this invention have equivalent weights of between about 250 and about 1000, and preferably between about 200 and about 700.

Examples of suitable halogenated aromatic polycarboxylic acids for use in this invention include brominated and chlorinated terephthalic and isophathalic acids, brominated and chlorinated di- and tri- phenyldicarboxylic acids, and brominated and chlorinated naphthalene dicarboxylic acids and mixtures thereof, with brominated terephthalic acids, such as di- and tetrabromoterephthalic acids being preferred. Unexpectedly, it has been found that these halogenated aromatic polycarboxylic acids can be substituted for all or part of conventional polycarboxylic acids such as isophthalic acid in a hybrid resin formulation to impart flame retardancy without significantly affecting the preparation, processing, and basic engineering properties of the hybrid resin. This behavior is distinguishable from the incorporation of other halogenated monomers in a hybrid resin formulation such as halogenated phthalic anhydrides or halogenated glycols which prevent the formation of hydroxyl terminated unsaturated polyesters. The use of halogenated aromatic polycarboxylic acids in a flame retardant hybrid resin is also desirable over adding conventional flame retardant additives because conventional additives impart flame retardance at the expense of other properties, such as gel time, flexural modulus and impact resistance. It is important that the polycarboxylic acid moieties of the polyester polyol comprise from about 15 to about 50 mole % of at least one halogenated aromatic polycarboxylic acid, because below about 15 mole %, flame retardant properties are not achievable, and above about 50 mole %, the polyol will have too much acid (COOH—) termination resulting in polyamide formation and $CO_2$ production when combined with the isocyanate A-side of the hybrid resin and loss of the desired urethane reaction.

Typical unsaturated carboxylic acids or anhydrides include maleic acid, fumaric acid, citaconic acid, chloromaleic acid, allyl succinic acid, itaconic acid, mesaconic acid, their anhydrides and mixtures thereof, with maleic anhydride being the preferred choice. Examples of polyhydric alcohols which are useful in the invention include neopentyl glycol, ethylene glycol, diethylene glycol, triethylene glycol, propylene glycol, dipropylene glycol, 1,4-butanediol, polyethylene glycol, mannitol, 1,3-propanediol, 1,6-hexanediol, 1,3-butylene glycol and mixtures thereof, with neopentyl glycol, diethylene glycol, ethylene glycol and mixtures thereof being preferred.

Optionally, a catalyst capable of catalyzing the polyurethane-forming reaction between the polyisocyanate and the polyhydroxyl compounds can be used in this invention. These catalysts include tertiary amines such as N,N-dimethylcyclohexylamine, tertiary phosphines such as trialkylphosphines, strong bases such as alkali and alkaline earth metal hydroxides, alkoxides, and phenoxides, acidic metal salts of strong acids such as ferric chloride and organotin compounds such as dibutyltin dilaurate. Other commonly used catalysts for making polyurethanes can be found in U.S. Pat. No. 4,280,979, incorporated herein by reference.

Optionally, fibers, fillers, catalysts, pigments, mold release agents, low profile additives, water scavengers, internal lubricants, and other processing aids, all of which are well known to those skilled in the art, can be added to the hybrid resins of the invention. Various organic or inorganic fibers or fillers can be added to improve the reinforcing properties of the hybrid resins and/or reduce the cost. Such organic fibers include polyacrylonitrile fibers (PAN), pitch-based carbon fibers, aromatic polyamide fibers, liquid crystal polyester fibers or any polymeric fiber that improves the properties of the hybrid. Inorganic fibers include glass and whiskers, while inorganic fillers include such materials as aluminum trihydrate, calcium carbonate, clay, talc, mica, silica beads, calcium sulfate, ammonium polyphosphate, etc. While the amounts of filler, fiber or other additives will vary depending on the application, preferably, filler is used at levels of about 20 phr (parts per hundred resin) to about 120 phr. Further, about 20 wt. % to about 50 wt. % fibrous reinforcement can also be added to the hybrid resins. For example, in one preferred embodiment, about 40 phr filler and 30 wt. % fiber are used to form a hybrid resin according to the invention.

The method for making flame retardant hybrid resins according to the invention is as follows. A hybrid resin is formed by reacting the liquid ingredients of the A-side, which include the polyisocyanate and the free radical polymerization initiator, with the B-side liquid ingredients, which include the ethylenically unsaturated monomer and the polyol comprising an oligomer obtained by the condensation reaction of a polycarboxylic acid and an unsaturated polycarboxylic acid or anhydride with a polyhydric alcohol, wherein the polycarboxylic acid moieties of the polyester polyol comprise from about 15 to about 50 mole % of at least one halogenated aromatic polycarboxylic acid. Next, any additional powder ingredients, such as an inert filler and a water scavenger, are added to form a liquid paste. The liquid paste is then used in a molding process such as resin transfer molding, spray-up or other reactive molding processes.

While applicant does not wish to be bound by any theory, it is believed that when the A- and B-sides of the hybrid resin are reacted, the hydroxyl and acid end groups of the polyester polyol react with the isocyanate groups, and the ethylenically unsaturated monomer copolymerizes with the unsaturated moieties in the polyester polyol to form a polyester-polyurethane. Crosslinking occurs through vinyl polymerization of the olefinically unsaturated moieties of the polyester polyol and the polymerizable ethylenically unsaturated monomer.

The invention described herein is illustrated, but not limited, by the following examples.

EXAMPLES

EXAMPLE 1

Polyester Polyols Prepared with Halogenated Aromatic Polycarboxylic Acid

Unsaturated polyester polyols containing halogenated aromatic polycarboxylic acids which were used to prepare the flame retardant polyester-polyurethane hybrid resins of the invention were prepared as follows:

Unsaturated polyester polyols containing a halogenated aromatic polycarboxylic acid were prepared by charging dibromoterephthalic acid (1053 g, 3.25 moles) and diethylene glycol (909.5 g, 8.56 moles) into an electrically-heated three-liter resin kettle equipped with a stirrer, thermometer, nitrogen purge, and a distillation column. The distillation train consisted of a packed, steam-jacketed partial distillation column, a distillation head containing a thermometer for monitoring distillate temperature, a total condenser, and a receiver. Once the dibromoterephthalic acid and diethylene glycol had been mixed, maleic anhydride (318.5 g, 3.25 moles) and 0.57 g of dibutyl tin maleate (Fascat 4100, M & T Chemical, Rahway, N.J.) were charged to the reactor, and the nitrogen sparge rate was adjusted to 0.5 SCFH. The polymerization mixture was then heated to 230° C. Reaction temperature, head temperature on the distillation column, quantity of distillate, and acid number were monitored periodically. The results are tabulated in Table 1, below.

After three hours, the evolution of water had subsided, and the distillation column was removed and replaced by a distillation head and total condenser. The nitrogen sparge rate was increased to 2.0 SCFH, and the polymerization continued until the acid number was less than 1.0.

TABLE I

| Time | Temperature (C.) | | Distillate | Acid |
|---|---|---|---|---|
| Hours | Reaction | Distillate | ml | No. |
| 0 | | | | |
| 0.5 | 93 | 24 | 0 | |
| 1.0 | 171 | 100 | 5 | |
| 1.5 | 199 | 98 | 80 | |
| 2.0 | 228 | 94 | 155 | |
| 2.5 | 230 | 89 | 167 | |
| 3.0 | 230 | 80 | 175 | 4.5 |
| 3.5 | 230 | — | 180 | |
| 4.0 | 230 | — | 183 | 1.1 |
| 5.0 | 230 | — | 189 | 0.7 |

The polymerization mixture was then cooled to 70° C., and 0.2 g hydroquinone was added. Styrene (500 g) containing 0.2 g 1,4-napthoquinone and 0.1 g p-benzoquinone, was then added to adjust the solids content to approximately 75%. This blend was assayed for hydroxyl and acid numbers, solids content and bromine content. The results were as follows:

TABLE II

| | Target | Found |
|---|---|---|
| Hydroxyl Number | 111 | 119 |
| Acid Number | <1 | 0.6 |
| Solids, % | 75.0 | 75.3 |
| Bromine, % | 24.8 | 20.9 |

Typical water content of the polyester polyols used in the invention is less than 1%, preferably less than 0.2% and most preferably less than 0.05%. The removal of water is important for two reasons. First, the removal of water is necessary to obtain the desirable molecular weight of the polyester polyol. Second, the water will react with the isocyanate in the hybrid resin causing undesirable foaming.

Typical molecular weights of the polyester polyols (on a solid basis) useful in the instant invention are between about 500 and about 2000 g/mole, and preferably between about 400 and about 1400 g/mole. If the polyol is difunctional, the equivalent weight of the polyol is half the molecular weight, while polyfunctional polyols would have equivalent weights equal to the molecular weight divided by the -OH functionality of the polyol.

EXAMPLE 2

Hybrid Resins Prepared with Halogenated Aromatic Polycarboxylic Acid-Containing Polyester Polyols The two components of the hybrid resin, the A- and B-sides, were prepared separately by mixing the ingredients of each side and allowing them to deaerate. The B-side was then added to the A-side and mixed. The formulations of the A-side, made at a 100 isocyanate index, and the B-side are presented in Table III. The isocyanate, Isonate 240, is a trademark of Dow Chemical Company, Midland, Mich. The unsaturated polyester polyol of the B-side was prepared in accordance with Example 1.

TABLE III

| Reactants | |
|---|---|
| A-Side | |
| Polyisocyanate (Isonate 240, Eq. Wt. 226.3 | 112.6 g |
| Benzoyl Peroxide | 3.3 g |
| Styrene | 3.3 g |
| B-side | |
| Polyol (1.0M/1.0M/2.64M MAN/DBTA/DEG, Eq. Wt. 623.0, 75.3% Solids) | |
| Styrene | 20.12 g |
| N,N-Diethylaniline | 0.68 g |

MAN = maleic anhydride
DBTA = dibromoterephthalic acid
DEG = diethylene glycol

After thorough mixing, the liquid hybrid is stirred and poured into a 30×30×0.3 cm mold which is open at one end. This mold consisted of two glass plates, separated by a U-shaped gasket, which are clamped together. Prior to assembling the mold the glass plates were sprayed with Miller-Stephenson Dry Lubricant MS-122, a mold release agent. The filled mold was allowed to stand for 60 minutes at ambient temperature. It was then cured at 105° C. for 2 hours in an explosion-proof oven. Test specimens were cut from this casting. The properties of this flame retardant hybrid resin formulation are summarized in Table IV below, along with data for comparison purposes for a conventional, non-flame retardant hybrid resin formulation described in Comparative Example 1.

COMPARATIVE EXAMPLE 1

Conventional Hybrod Resin

A conventional hybrid resin was made for comparison purposes. Preparation of conventional hybrid resins is described further in "Processing Unsaturated Polyesters Based on Amoco Isophthalic Acid," Bulletin IP-43B, available from Amoco Chemical Company, Chicago, Ill., incorporated by reference herein. A polyol containing maleic anhydride, isophthalic acid, and diethylene glycol in a molar ratio of 1.00/1.00/1.64 was prepared by the method of Example 1. This polyol had the following characteristics:

COMPARATIVE TABLE I

| | Target | Found |
|---|---|---|
| Hydroxyl Number | 145 | 127 |
| Acid Number | <1 | 0.36 |
| Solids, % | 75.0 | 75.1 |

A hybrid resin was then prepared from this polyol and an A-side (Isonate 240 and BPO polymerization initiator) and molded, as described in Example 2. The properties of this material are set forth in Table IV in comparison with the flame retardant hybrid resin of the invention. As shown in Table IV, the hybrid resin of the invention comprising a halogenated aromatic acid has a UL94 rating of V-0 which is the optimum rating under this test. UL94 is a test of ignition resistance designed by Underwriter's Laboratory and described in Publication UL94. The conventional hybrid resin was not self-extinguishing under UL94 test conditions and had a rating of HB (horizontal burn). It has a limiting oxygen index (LOI), which is the %02÷(%02+%N2), of 25%.

Table IV illustrates that except for flame retardancy, the properties of the flame retardant hybrid resin of the invention and a conventional hybrid resin are quite similar. Notched and No-Notch Izod impact strength, (as tested in accordance with ASTM D256), yield tensile strength (YTS), elongation at yield (EY), ultimate tensile strength (UTS), elongation at break (EB), (all performed in accordance with ASTM D638), flexural modulus (FM), (ASTM D790) and heat deflection temperature (HDT), (ASTM D648) were all comparable.

TABLE IV

| | EXAMPLE 2 | COMPARATIVE EXAMPLE 1 |
|---|---|---|
| UL94 | V-0 | HB |
| YTS, kPa | 50,000 | 46,000 |
| % EY | 4.1 | 4.2 |
| UTS, kPa | 47,000 | 39,000 |
| % EB | 25 | 38 |
| FM, mPa | 2340 | 2370 |
| Izod, J/m | | |
| Notched | 21.4 | 21.4 |
| No-Notch | 918 | 1265 |

TABLE IV-continued

| | EXAMPLE 2 | COMPARATIVE EXAMPLE 1 |
|---|---|---|
| HDT, °C. | 56 | 52 |

EXAMPLE 3

Hybrid Resins Prepared with Halogenated Aromatic Polycarboxylic Acid-Containing Polyester Polyols and NPG Flame retardant hybrid resins were prepared with halogenated aromatic polycarboxylic acids in accordance with Examples 1 and 2, except that neopentyl glycol (NPG) was substituted for diethylene glycol in the polyol preparation. The results are reported in Table V.

TABLE V

| | EXAMPLE 3(a)* | EXAMPLE 3(b)** |
|---|---|---|
| UL94 | V-0 | V-i |
| YTS, kPa | 61,360 | 62,750 |
| FM, mPa | 2800 | 2910 |
| Izod, J/m No-Notch | 326 | 390 |
| DT, °C. | 69 | 61 |

*1.0/1.0/2-64 - MAN/DBTA/NPG; 21.7 wt. % bromine
**1.0/1.0/2.80 - MAN/DBTA/NPG; 12.6 wt. % bromine The hybrid resins of Examples 3(a) and 3(b) both had flame retardant properties, although Example 3(a) had the optimum UL94 rating of V-0. The V-1 rating of Example (b) is the second best rating achievable under this test. Table V shows that neopentyl glycol may be the glycol of choice for a polyol containing a halogenated aromatic polycarboxylic acid since the physical properties were improved over those shown with hybrid resins containing diethylene glycol in Table IV. Table V further shows that better flame retardant properties are seen in the hybrid resin containing a higher weight percent halogen.

EXAMPLE 4

Flame Retardant Synergists

Flame retardant synergists such as antimony oxide can be used to further improve the flame retardance of the hybrid resins of the invention. Hybrid resins made with halogenated aromatic polycarboxylic acid-containing polyols were prepared according to Example 2.

The flame retardant effect of these hybrid resins was further enhanced with from about 1 wt. % to about 10 wt. % $Sb_2O_3$. Table VI shows the results.

TABLE VI

| Sample | Br Wt. % | Sb Wt. % | UL94 | LOI |
|---|---|---|---|---|
| 1 | 17.0 | | V-1 | 28 |
| | 10.9 | 4.6 | V-0 | 30 |
| 2 | 15.1 | | HB | 28 |
| | 11.8 | 4.1 | V-0 | 29 |
| 3 | 11.7 | | HB | 30 |
| | 9.8 | 3.1 | V-0 | 31 |

Sample 1: Isonote 240 - 1.0/1.0/2.64 MAN/DBTA/DEG + 9.6 wt. % $Sb_2O_3$
Sample 2: Isonate 240 - 1.0/1.0/2.64 MAN/DBTA/DEG + 8.6 wt. % $Sb_2O_3$
Sample 3: Isonate 143L - 2.0/1.0/4.2 MAN/DBTA/DEG + 5.4 wt. % $Sb_2O_3$ Table VI indicates that smaller amounts of halogenated aromatic polycarboxylic acids can be used to achieve flame retardant properties if a small amount of a flame retardant synergist such as antimony oxide is added to the hybrid resin formulations of the invention. Other examples of flame retardant synergists useful in the invention include phosphorus esters such as tricresyl phosphate and other antimony compounds such as sodium antimonate and antimony sulfide.

The hybrid resin compositions made according to the invention have many advantages. First, the compositions of the invention provide flame retardant hybrid resins with good physical properties. Second, they enable a formulation which does not require large amounts of flame retardant additives that can separate or settle. Third, these hybrid resin compositions do not substantially alter the cure behavior of the hybrid resins and can be prepared by conventional methods.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

What is claimed is:

1. A polyester-polyurethane hybrid resin formed by the reaction of:

(a) an A-side composition comprising a polyfunctional isocyanate compound and a free radical polymerization catalyst; and (b) a B-side composition comprising a mixture of an ethylenically unsaturated monomer solution which has dissolved therein about 40–90 wt. % of a substantially water-free, unsaturated polyester polyol having an acid number less than five, said polyester polyol comprising an oligomer obtained by the condensation reaction of a polycarboxylic acid and an unsaturated polycarboxylic acid or anhydride with a polyhydric alcohol, wherein the polycarboxylic acid moieties of the polyester polyol comprise from about 15 to about 50 mole % of at least one halogenated aromatic polycarboxylic acid comprising at least one member selected from the group consisting of brominated and chlorinated terephthalic and isophathalic acids, brominated and chlorinated di- and tri-phenyldicarboxylic acids, and brominated and chlorinated naphthalene dicarboxylic acids and mixtures thereof.

2. The hybrid resin of claim 1, wherein the halogenated aromatic polycarboxylic acid comprises a polybrominated terephthalic acid.

3. The hybrid resin of claim 2, wherein the halogenated aromatic polycarboxylic acid comprises dibromoterephthalic acid.

4. The hybrid resin of claim 1, wherein the polyester-polyurethane hybrid resin comprises about 1 wt. % to about 10 wt. % of a flame retardant synergist.

5. The hybrid resin of claim 1, wherein the halogenated aromatic polycarboxylic acid comprises dibromoterephthalic acid, the unsaturated polycarboxylic acid or anhydride comprises maleic anhydride, and the polyhydric alcohol is selected from the group consisting of diethylene glycol, ethylene glycol and neopentyl glycol and mixtures thereof.

6. The hybrid resin of claim 1 further comprising a fibrous reinforcement.

7. The hybrid resin of claim 6 wherein the fibrous reinforcement is selected from the group consisting of polyacrylonitrile fibers, pitch-based carbon fibers, aromatic polyamide fibers, liquid crystal polyester fibers, glass fibers and whiskers.

8. The hybrid resin of claim 1, wherein the B-side further comprises a urethane catalyst.

9. The hybrid resin of claim 1 further comprising an inert filler.

10. The hybrid resin of claim 9 wherein the inert filler is selected from the group consisting of aluminum trihydrate, calcium carbonate, clay, talc, mica, silica beads, calcium sulfate and ammonium polyphosphate.

11. A process for making a polyester-polyurethane hybrid resin comprising reacting:

(a) an A-side composition comprising a polyfunctional isocyanate compound and a free radical polymerization catalyst; and (b) a B-side composition comprising a mixture of an ethylenically unsaturated monomer solution which has dissolved therein about 40–90 wt. % of a substantially water-free, unsaturated polyester polyol having an acid number less than five, said polyester polyol comprising an oligomer obtained by the condensation reaction of a polycarboxylic acid and an unsaturated polycarboxylic acid or anhydride with a polyhydric alcohol, wherein the polycarboxylic acid moieties of the polyester polyol comprise from about 15 to about 50 mole % of at least one halogenated aromatic polycarboxylic acid comprising at least one member selected from the group consisting of brominated and chlorinated terephthalic and isophathalic acids, brominated and chlorinated di- and tri-phenyldicarboxylic acids, and brominated and chlorinated naphthalene dicarboxylic acids and mixtures thereof.

12. A molded article made by the process of claim 11.

* * * * *